United States Patent [19]

Marumoto et al.

[11] Patent Number: 5,393,822
[45] Date of Patent: Feb. 28, 1995

[54] CHOPPED CARBON FIBER STRANDS COATED WITH RESIN AND MOLDING OBTAINED THEREFROM

[75] Inventors: Motoi Marumoto; Eiji Fujisawa; Hiroaki Shono, all of Fukushima, Japan

[73] Assignees: Nitto Boseki Co., Ltd., Fukushima; Kawasaki Steel Corporation, Kobe; Mitsubishi Gas Chemical Company, Inc., Tokyo, all of Japan

[21] Appl. No.: 986,338

[22] Filed: Dec. 7, 1992

[30] Foreign Application Priority Data

Dec. 16, 1991 [JP] Japan .................................. 3-332067

[51] Int. Cl.[6] .......................... C08J 5/06; C08K 3/04; C08L 75/04
[52] U.S. Cl. .................................. 524/496; 524/495; 523/206; 523/222
[58] Field of Search ................ 524/496, 495; 523/206, 523/222

[56] References Cited

U.S. PATENT DOCUMENTS 5,108,458  4/1992  Marumoto et al. .................. 8/115.6

FOREIGN PATENT DOCUMENTS 70162  1/1983  European Pat. Off. .
256852  2/1988  European Pat. Off. .
314157  5/1989  European Pat. Off. .
368312  5/1990  European Pat. Off. .
501744  9/1992  European Pat. Off. .
6311302  10/1982  Japan .
64202  11/1983  Japan .
58-88624  11/1983  Japan .
61-53385  11/1986  Japan .

Primary Examiner—Paul R. Michl
Assistant Examiner—U. K. Rajguru
Attorney, Agent, or Firm—Foley & Lardner

[57] ABSTRACT

Resin-coated chopped carbon fiber stands for direct injection molding including chopped carbon fiber strands coated with 20–50 parts by weight of a thermosetting resin and 0.5–30 parts by weight of an urethane resin based on 100 parts by weight of the carbon 2iber chopped strands.

10 Claims, No Drawings

CHOPPED CARBON FIBER STRANDS COATED WITH RESIN AND MOLDING OBTAINED THEREFROM

BACKGROUND OF THE INVENTION

The present invention relates to carbon fiber chopped strands coated with resins and more particularly, to carbon fiber chopped strands coated with resins which can be suitably used for direct injection molding.

Carbon fiber-reinforced thermoplastic resins have been noticed in their high functions as well as high strength and high elasticity which are characteristics of carbon fibers and recently are being increasingly used as antistatic materials, EMI shielding materials utilizing their electrical conductivity and various sliding materials such as bearings utilizing their sliding properties.

Hitherto, moldings of the carbon fiber-reinforced thermoplastic resins have been generally produced by previously heating, melting and mixing carbon fiber chopped strands and thermoplastic resins using extruders to make them into injection moldable form, namely, to make pellets and then injection molding the pellets.

However, the above method has the problems that each of the carbon fiber chopped strands separates before the mixing step to cause deterioration of conveyability or meterability and the carbon fibers are cut short in the mixing step to cause deterioration in properties of the moldings.

Japanese Patent Kokoku (Post Exam Publn) No. 64-202 proposes a method in which carbon fiber chopped strands are previously coated with a thermosetting resin and the coated chopped strands per se are directly molded or a dryblend of the carbon fiber chopped strands with thermoplastic resin pellets are molded.

However, the materials used for ordinary molding receive a large impact force by vibration during pneumatic conveying or dryblending. When the fibrous materials in a dryblend are placed under such environment, they split and become cotton-like by separation or become powdery by crushing and as a result, the uniform blending state is lost. This also causes fluctuation in resin content or troubles in molding. Even when carbon fiber chopped strands coated with a thermosetting resin which are produced according to the method of the above-mentioned patent publication are mixed with a thermoplastic resin and directly molded, separation of the respective carbon fiber chopped strands before mixing step cannot be sufficiently prevented.

SUMMARY OF THE INVENTION

The object of the present invention is to provide carbon fiber chopped strands coated with a resin from which can be produced moldings excellent in performance without separation of carbon fiber chopped strands before molding when a mixture of the resin-coated carbon fiber chopped strands with other resin is directly injection molded or the resin-coated carbon fiber chopped strands per se are directly injection molded.

The inventors have conducted intensive research in an attempt to solve the above problems. As a result, it has been found that the above object can be attained by coating carbon fiber chopped strands with a specific amount of a thermosetting resin and a specific amount of an urethane resin. Thus, the present invention has been accomplished.

That is, the present invention resides in carbon fiber chopped strands coated with a resin, characterized by comprising carbon fiber chopped strands coated with 5-50 parts by weight of a thermosetting resin and 0.5-30 parts by weight of an urethane resin for 100 parts by weight of the carbon fiber chopped strands.

DESCRIPTION OF THE INVENTION

The present invention will be explained in detail.

The carbon fiber chopped strands used in the present invention may be any of PAN type, pitch type and others and are not limited in their starting materials and in their production method. The length of the carbon fiber chopped strands is not critical, but is usually 1-50 mm. The diameter and the number of filaments which constitute the carbon fiber chopped strand are also not critical, but the diameter is usually 3-23$\mu$ and the number of the filaments is usually 100-100,000. The carbon fiber chopped strands may be previously applied with a sizing agent.

The thermosetting resins used for coating the carbon fiber chopped strands in the present invention include, for example, epoxy resins, phenolic resins, unsaturated polyester resins and diallyl phthalate resins.

As the epoxy resins, there may also be used any compounds containing at least two epoxy groups in the molecule. The epoxy resins generally used are of bisphenol A type in many cases, but those of novolak type and flame-retardant type can also be used in the present invention. The epoxy resins used in the present invention are preferably those which are solid at room temperature for avoiding the chopped strands coated with the resin becoming tacky.

As phenolic resins, any of novolak type and resol type can be used, but preferred are those which contain no free phenol and are high in stability.

As unsaturated polyester resins, there may be used resins having a melting point of 50°-130° C. obtained by condensation of glycols such as ethylene glycol and propylene glycol and polybasic acids or acid anhydrides such as phthalic acid, isophthalic acid, phthalic anhydride, maleic acid, fumaric acid and maleic anhydride or of mixtures thereof.

As diallyl phthalate resins, there may be used o-phthalate type prepolymers or isophthalate type prepolymers having a molecular weight of 5,000-30,000 which are called $\beta$ polymers.

The carbon fibers may be coated with the thermosetting resins together with curing agents for these resins. The curing agents may be known ones and the amount thereof varies depending on the amount of the resin, but is generally 0.1-20 parts by weight, preferably 0.5-10 parts by weight based on 100 parts by weight of the thermosetting resin.

The present invention is characterized by using an urethane resin together with the above-mentioned thermosetting resin for coating the carbon fiber chopped strands.

The urethane resins used in the present invention may be those which have thermoplasticity and are soluble in solvents and are obtained by addition polymerization of diisocyanates with compounds having two hydrogen atoms reactive with isocyanate group (such as diols).

The diisocyanates include, for example, tolylene diisocyanate, diphenylmethane diisocyanate, xylylene diisocyanate, phenylene diisocyanate, naphthalene diisocyanate, hexamethylene diisocyanate and isophorone diisocyanate, these diisocyanates which are chemically modified, reaction products of these isocyanate compounds with the following diols and mixtures of these isocyanates.

As the compounds having two hydrogen atoms reactive with isocyanate group, there may be used diols having a molecular weight of 62–500, polyester type diols, polyether type diols and others without any limitations.

As examples of the urethane resins having thermoplastic properties in the present invention, mention may be made of thermoplastic urethane elastomers and urethane resins having no terminal isocyanate groups.

Molecular weight of the urethane resins having thermoplastic properties used in the present invention is generally 1,000–300,000, preferably 10,000–100,000.

The amount of the thermosetting resin coated on carbon fiber chopped strands is 5–50 parts by weight, preferably 15–30 parts by weight for 100 parts by weight of the carbon fiber chopped strands as mentioned hereabove. If it is less than 5 parts by weight, coating with the resin cannot be sufficiently and uniformly performed and there occurs inferior dispersion of the chopped strands in the resulting molded articles. If it is more than 50 parts by weight, chopped strands bind to each other in carrying out the dispersion in water mentioned below and may become lump.

The amount of the urethane resin coated on carbon fiber chopped strands is 0.5–30 parts by weight, preferably 1–20 parts by weight for 100 parts by weight of the carbon fiber chopped strands. If it is less than 0.5 part by weight, separation of the chopped strand cannot be sufficiently inhibited as aimed at by the present invention. If it is more than 30 parts by weight, chopped strands bind to each other to cause formation of lumps.

The weight ratio of thermosetting resin/urethane resin is usually 99/1–70/30, preferably 98/2–80/20. If the ratio is higher than 99/1, the effect of the present invention cannot be sufficiently obtained and if it is lower than 70/30, chopped strands bind to each other to cause formation of lumps.

One example of the method of producing carbon fiber chopped strands coated with resin will be explained.

First, a treating solution containing a thermosetting resin and an urethane resin is prepared. This can be prepared by dissolving both the resins in a solvent which is a common solvent for both resins and is compatible with water. As examples of the solvent, mention may be made of acetone, diacetone alcohol, dioxane, methyl ethyl ketone, dimethylformamide and tetrahydrofuran. In this case, as a curing agent for the thermosetting resin, known a curing agent for thermosetting resin may further be added to the solvent. Thereafter, chopped strands are impregnated with the treating solution. The chopped strands may be merely dipped in the treating solution, but when impregnation is insufficient, the treating solution may be lightly stirred. Further, the solution is preferably subjected to degassing for promoting the impregnation.

The chopped strands thus impregnated with the resin solution are separated from the solution, for example, by screening and then, are introduced into a water medium with stirring for removal of the solvent. If necessary, resin content may be adjusted by squeezing after the separation from the treating solution. The chopped strands are dispersed in the water medium by introducing them thereinto with stirring. Temperature of the water medium may be room temperature, but may be elevated to about 60°–80° C. for easy removal of the solvent. Moreover, the water medium may contain a dispersant soluble in water such as polyvinyl alcohol for acceleration of dispersion of the chopped strands.

After completion of removal of the solvent and completion of dispersion, the chopped strands coated with resin are separated from the dispersion system after left for cooling to room temperature, if temperature of the dispersion system has been elevated. The separation can be carried out by customary methods, for example, filtration such as screening. The separated resin-coated chopped strands are dried at 40°–140° C. by optional methods such as hot-air drying.

Carbon fiber chopped strands uniformly coated with the thermosetting resin and the urethane resin are obtained by the methods as mentioned above and the resulting resin-coated chopped strands do not adhere to each other even after drying.

The carbon fiber chopped strands coated with thermosetting resin and the urethane resin of the present invention as they are, (namely, using the coating resin as a matrix resin) can be molded. In this case, it is preferred to use carbon fiber chopped strands impregnated also with a curing agent for the thermosetting resin which is the coating resin in production of the resin-coated carbon fiber chopped strands of the present invention.

The carbon fiber chopped strands coated with the thermosetting resin and the urethane resin can also be molded together with a thermosetting resin or a thermoplastic resin as a matrix resin and preferably can be molded in the form of a dryblend with the thermoplastic resin. Examples of the thermoplastic resin are polypropylene, polyethylene, polystyrene, poly(styreneacrylonitrile), polyamide, polybutylene terephthalate, polyethylene terephthalate, polycarbonate, polyacetal, polyphenylene oxide, polyether imide, polyphenylene sulfide, polyether sulfone and polyetherether ketone.

Examples of the thermosetting resin are epoxy resin, phenolic resin, unsaturated polyester resin, diallyl phthalate resin, melamine resin and polyimide resin and these may not necessarily be the same as those used for coating. In this case, known curing agents for the thermosetting resins may optionally be used. The molding method has no special limitation, but injection molding is effective.

The present invention is explained in more detail by the following nonlimiting examples.

EXAMPLE 1

23.8 parts by weight of bisphenol A type epoxy resin having an epoxy equivalent of 480 and 1.24 part by weight of an elastomer type thermoplastic urethane resin (PANDEX T-5265L manufactured by Dainippon Ink & Chemicals Inc.) were dissolved in 25 parts by weight of methyl ethyl ketone to prepare a treating solution. In this treating solution were dipped 100 parts by weight of carbon fiber chopped strands having a cut length of 3 mm and a filament diameter of $12\mu$ and comprising 40,000 filaments and were mixed so that uniform coating can be attained, followed by degassing under reduced pressure (100 Torr) to sufficiently impregnate the chopped strands with the solution.

1000 parts by weight of an aqueous solution containing 0.2 part by weight of polyvinyl alcohol was charged in a 2 liter stainless steel tank equipped with a stirrer and a heating device. The above carbon fiber chopped strands impregnated with the resin solution were introduced into the tank and heated to 60° C. with stirring. During this heating step the chopped strands impregnated with the resin solution were dispersed in a completely uniform state. Thirty minutes was required for attaining the completely uniform dispersion.

Then, this dispersion system was left for cooling to room temperature and thereafter the resin-coated chopped strands in wet state were separated by filtration and water was sufficiently removed therefrom. Then, the chopped strands were hot-air dried at 40° C. to obtain resin-coated chopped strands.

The resulting resin-coated chopped strands were not tacky and were uniformly coated to the inner part and the sum of the coating amounts of the two resins on the chopped strands was 25% by weight which corresponded to the initial charging amount.

EXAMPLE 2

Resin-coated carbon fiber chopped strands were prepared in the same manner as in Example 1 except that the treating solution was prepared by dissolving 22.5 parts by weight of bisphenol A type epoxy resin having an epoxy equivalent of 480 and 2.5 parts by weight of the urethane resin used in Example 1 in 25 parts by weight of methyl ethyl ketone.

The resulting resin-coated chopped strands had no tackiness and were uniformly coated to the inner part of the strands. The sum of the coating amounts of the two resins on the chopped strands was 25% by weight which corresponded to the initial charging amounts thereof.

EXAMPLE 3

Resin-coated carbon fiber chopped strands were prepared in the same manner as in Example 1 except that the treating solution was prepared by dissolving 20 parts by weight of bisphenol A type epoxy resin having an epoxy equivalent of 480 and 5 parts by weight of the urethane resin used in Example 1 in 25 parts by weight of methyl ethyl ketone.

The resulting resin-coated chopped strands had no tackiness and were uniformly coated to the inner part. The sum of the coating amounts of the two resins on the chopped strands was 25% by weight which corresponded to the initial charging amounts thereof.

COMPARATIVE EXAMPLE 1

A raw material (coal pitch) for carbon fibers was spun and infusibilized and calcined to produce carbon fiber chopped strands having a filament diameter of 12μ, comprising 40,000 filaments and having a cut length of 3 mm, to which known a sizing agent was applied.

COMPARATIVE EXAMPLE 2

Resin-coated carbon fiber chopped strands were prepared in the same manner as in Example 1 except that the treating solution used was prepared by dissolving 25 parts by weight of bisphenol A type epoxy resin having an epoxy equivalent of 480 in 25 parts by weight of methyl ethyl ketone.

EXAMPLE 4

Resin-coated carbon fiber chopped strands were prepared in the same manner as in Example 1 except that the treating solution used was prepared by dissolving 23.8 parts by weight of novolak type phenolic resin having a softening point of 110° C. and 1.24 part by weight of the urethane resin used in Example 1 in 25 parts by weight of methyl ethyl ketone.

The resulting resin-coated chopped strands had no tackiness and were uniformly coated to the inner part. The sum of the coating amounts of the two resins on the chopped strands was 25% by weight which corresponded to the initial charging amounts thereof.

EXAMPLE 5

Resin-coated carbon fiber chopped strands were prepared in the same manner as in Example 1 except that the treating solution used was prepared by dissolving 22.5 parts by weight of novolak type phenolic resin having a softening point of 110° C. and 2.5 parts by weight of the urethane resin used in Example 1 in 25 parts by weight of methyl ethyl ketone.

The resulting resin-coated chopped strands had no tackiness and were uniformly coated to the inner part. The sum of the coating amounts of the two resins 1 on the chopped strands was 25% by weight which corresponded to the initial charging amounts thereof.

EXAMPLE 6

Resin-coated carbon fiber chopped strands were prepared in the same manner as in Example 1 except that the treating solution used was prepared by dissolving 20 parts by weight of novolak type phenolic resin having a softening point of 110° C. and 5 parts by weight of the urethane resin used in Example 1 in 25 parts by weight of methyl ethyl ketone.

The resulting resin-coated chopped strands had no tackiness and were uniformly coated to the inner part. The sum of the coating amounts of the two resins on the chopped strands was 25% by weight which corresponded to the initial charging amounts thereof.

COMPARATIVE EXAMPLE 3

Resin-coated carbon fiber chopped strands were prepared in the same manner as in Example 1 except that the treating solution used was prepared by dissolving 25 parts by weight of novolak type phenolic resin having a softening point of 110° C. in 25 parts by weight of methyl ethyl ketone.

Evaluation of Properties

I. Measurement of unseparability of chopped strands:

The unseparability of the resin-coated carbon fiber chopped strands obtained in Examples 1–6 and Comparative Examples 2 and 3 and of the carbon fiber chopped strands of Comparative Example 1 was evaluated by the following method.

A given amount of the chopped strands which passed through a sieve of 5 meshes and remained on a sieve of 12 meshes were put in a container of 1000 ml. This container was vibrated up and down 10,000 times and then the chopped strands were sifted by sieves of 5 meshes and 12 meshes. The proportion of the weight of chopped strands which passed through the sieve of 5 meshes and remained on the sieve of 12 meshes to the total weight of the chopped strands was employed as the unseparability of the chopped strands.

II. Measurement of tensile strength:

First, a test piece for measurement of tensile strength was prepared by the following method.

(1) Carbon fiber-reinforced polybutylene terephthalate test piece

Each of the resin-coated carbon fiber chopped strands obtained in Examples 1–3 and Comparative Example 2 and polybutylene terephthalate (Valox manufactured by GE Plastics Japan Ltd.) were dryblended to make a dryblend containing 30% by weight of carbon fibers. A test piece was prepared therefrom by injection molding (molding temperature: 260° C., molding pressure: 1400 kg/cm²). Separately, the carbon fiber chopped strands of Comparative Example 1 and polybutylene terephthalate were compounded so that carbon fiber content was 30% by weight and injection molded to make a test piece.

(2) Carbon fiber-reinforced nylon test piece:

Each of the resin-coated carbon fiber chopped strands obtained in Examples 4–6 and Comparative Example 3 and nylon 66 (Leona manufactured by Asahi Kasei Kogyo K.K.) were dryblended to make a dryblend containing 30% by weight of carbon fibers. A test piece was prepared therefrom by injection molding (molding temperature: 270° C., molding pressure: 900 kg/cm²).

Separately, the carbon fiber chopped strands of Comparative Example 1 and polybutylene terephthalate were compounded so that carbon fiber content was 30% by weight and injection molded to make a test piece.

The resulting test piece was subjected to the following measurements.

(1) Tensile strength: This was measured in accordance with ASTM D638.

(2) Tensile strength after boiling: The test piece was placed in a pressure oven of 120° C. and 2 atm. (water vapor pressure) for 48 hours and thereafter, tensile strength of the test piece was measured in accordance with the above method (1).

Furthermore, tensile strength retention after boiling was calculated from the ratio of the tensile strength after boiling obtained in the above (2) to the tensile strength obtained in the above (1).

(3) Tensile strength after water absorption: The test piece was dipped in water (20° C.) for 24 hours and thereafter the tensile strength was measured by the above method (1).

Furthermore, tensile strength retention after water absorption was calculated from the ratio of the tensile strength after water absorption obtained in the above (3) to the tensile strength obtained in the above (1).

The results are shown in the following Tables 1 and 2.

TABLE 1

| Sample | Epoxy resin/urethane resin (Weight) | Unseparability (wt %) | Tensile strength (Before boiling) (kgf/cm²) | Tensile strength (After boiling) (kgf/cm²) | Retention of tensile strength after boiling (%) |
| --- | --- | --- | --- | --- | --- |
| Example 1 | 19/1 | 90 | 1250 | 1220 | 97.6 |
| Example 2 | 18/2 | 93 | 1230 | 1200 | 97.6 |
| Example 3 | 16/4 | 94 | 1240 | 1220 | 98.3 |
| Comparative Example 1 | | 10 | 1150 | 360 | 31.3 |
| Comparative Example 2 | 20/0 | 80 | 1220 | 1190 | 97.5 |

TABLE 2

| Sample | Phenolic resin/urethane resin (Weight) | Unseparability (wt %) | Tensile strength (Before water absorption) (kgf/cm²) | Tensile strength (After water absorption) (kgf/cm²) | Retention of tensile strength after water absorption (%) |
| --- | --- | --- | --- | --- | --- |
| Example 5 | 19/1 | 93 | 1400 | 1370 | 97.9 |
| Example 6 | 18/2 | 94 | 1390 | 1370 | 98.6 |
| Example 7 | 16/4 | 95 | 1380 | 1350 | 97.8 |
| Comparative Example 3 | 20/0 | 85 | 1380 | 1350 | 97.8 |

As can be seen from Tables 1 and 2, the resin-coated carbon fiber chopped strands of the Examples of the present invention obtained by coating carbon fiber chopped strands with a specific amount of epoxy resin or phenolic resin together with a specific amount of urethane resin were markedly high in unseparability. Besides, tensile strength of moldings obtained by molding a dryblend with a thermoplastic resin did not substantially reduce after boiling and thus the moldings were superior in water resistance.

The resin-coated carbon fiber chopped strands of the present invention are inhibited from separation before molding even when applied with a very strong shock. Accordingly, moldings can be efficiently obtained by injection molding the resin-coated carbon fiber chopped strands per se or dryblends thereof with thermoplastic resins or thermosetting resins. Furthermore, the resulting moldings are excellent in water resistance and do not reduce in mechanical strength even if they are left in wet state.

What is claimed is:

1. Resin-coated chopped carbon fiber strands for direct injection molding comprising chopped carbon fiber strands coated with 20–50 parts by weight of a thermosetting resin and 0.5–30 parts by weight of a urethane resin based on 100 parts by weight of the chopped carbon fiber strands.

2. The resin-coated chopped carbon fiber strands according to claim 1 wherein the amount of the urethane resin is 1–20 parts by weight based on 100 parts by weight of the chopped carbon fiber strands.

3. The resin-coated chopped carbon fiber strands according to claim 1 wherein the weight ratio of thermosetting resin/urethane resin is 99/1–70/30.

4. The resin-coated chopped carbon fiber strands according to claim 1 wherein the amount of the thermosetting resin is 15–30 parts by weight and the amount of the urethane resin is 1–20 parts by weight.

5. The resin-coated chopped carbon fiber strands according to claim 1 wherein the length of the chopped carbon fiber strands is 1–50 mm.

6. The resin-coated chopped carbon fiber strands according to claim 1 wherein the diameter of filaments which constitute the chopped carbon fiber strands is 3–23μ and the number of the filaments which constitute each chopped carbon fiber strand is 100–100,000.

7. The resin-coated chopped carbon fiber strands according to claim 1 wherein the thermosetting resin comprises at least one resin selected from the group consisting of epoxy resins, phenolic resins, unsaturated polyester resins and diallyl phthalate resins, and the urethane resin comprises at least one member selected from the group consisting of thermoplastic urethane elastomers and urethane resins having no terminal isocyanate groups.

8. The resin-coated chopped carbon fiber strands according to claim 1 wherein the molecular weight of the urethane resin is 1,000–300,000.

9. A molding obtained by directly injection molding the resin-coated chopped carbon fiber strands of claim 1 alone, or optionally, together with a at least one resin selected from the group consisting of thermosetting resin and thermoplastic resin.

10. The resin-coated chopped carbon fiber strands according to claim 8 wherein the molecular weight of the urethane resin is 10,000–100,000.

* * * * *